United States Patent
Kao et al.

(10) Patent No.: US 9,451,157 B2
(45) Date of Patent: Sep. 20, 2016

(54) VIDEO RECORDING DEVICE AND ASSOCIATED VIDEO RECORDING METHOD

(71) Applicant: Wistron Corporation, New Taipei (TW)

(72) Inventors: Chuan-Yen Kao, New Taipei (TW); Li-Jen Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/595,247

(22) Filed: Jan. 13, 2015

(65) Prior Publication Data

US 2016/0100094 A1    Apr. 7, 2016

(30) Foreign Application Priority Data

Oct. 7, 2014  (TW) .............................. 103134861 A (51) Int. Cl.
*H04N 5/232* (2006.01)
(52) U.S. Cl.
CPC .............................. *H04N 5/23212* (2013.01)
(58) Field of Classification Search
None
See application file for complete search history.

(56) References Cited

U.S. PATENT DOCUMENTS

| | | | | |
|---|---|---|---|---|
| 8,274,552 B2 * | 9/2012 | Dahi | ................... | H04N 5/23254 348/47 |
| 8,581,960 B2 * | 11/2013 | Kiyoshige | .......... | H04N 5/23212 348/36 |
| 8,754,977 B2 * | 6/2014 | Voss | ..................... | H04N 5/2258 348/230.1 |
| 8,817,166 B2 * | 8/2014 | Shimoda | ................ | G02B 7/365 348/207.99 |
| 2004/0061800 A1 * | 4/2004 | Yamazaki | .......... | H04N 5/23212 348/349 |
| 2007/0229697 A1 * | 10/2007 | Choi | ..................... | H04N 5/2257 348/345 |
| 2008/0166117 A1 | 7/2008 | Li et al. | | |
| 2008/0266652 A1 * | 10/2008 | Yazdanfar | ............. | G02B 21/245 359/363 |
| 2011/0096142 A1 * | 4/2011 | Kiyoshige | .......... | H04N 5/23212 348/36 |
| 2012/0044406 A1 * | 2/2012 | Shimoda | ................ | G02B 7/365 348/345 |
| 2012/0162379 A1 * | 6/2012 | Dahi | ................... | H04N 5/23254 348/47 |
| 2013/0002830 A1 * | 1/2013 | Pan | .......................... | G02B 7/36 348/49 |
| 2013/0027606 A1 * | 1/2013 | Voss | ..................... | H04N 5/2258 348/349 |
| 2013/0070061 A1 * | 3/2013 | Pan | ........................ | G03B 13/36 348/49 |
| 2013/0258140 A1 | 10/2013 | Lipson et al. | | |

(Continued)

FOREIGN PATENT DOCUMENTS

TW       201319711 A1    5/2013

OTHER PUBLICATIONS

TIPO Office Action dated Dec. 25, 2015 in corresponding Taiwan application (No. 103134861).

(Continued)

*Primary Examiner* — Michael Osinski
(74) *Attorney, Agent, or Firm* — McClure, Qualey & Rodack, LLP (57) ABSTRACT

A video recording device and an associated video recording method are provided. The video recording device includes a main capturing module, a supplementary capturing module and a controller. The main capturing module records a to-be-captured target according to a main focus parameter. The supplementary capturing module captures the to-be-captured target and generates a plurality of supplementary capturing pictures. The controller is electrically connected to the main capturing module and the supplementary capturing module. The controller selectively updates the main focus parameter according to the supplementary focus parameter. The supplementary focus parameter is obtained according to the supplementary capturing pictures.

9 Claims, 4 Drawing Sheets

(56) References Cited

U.S. PATENT DOCUMENTS

| | | | | |
|---|---|---|---|---|
| 2013/0322862 A1* | 12/2013 | Hsu | ....................... | G02B 7/285 396/125 |
| 2015/0002724 A1* | 1/2015 | Chuang | .............. | H04N 5/23293 348/346 |
| 2015/0049172 A1* | 2/2015 | Ramachandra | .... | H04N 13/0239 348/47 |
| 2015/0092066 A1* | 4/2015 | Geiss | ................... | H04N 5/2258 348/180 |
| 2015/0130988 A1* | 5/2015 | Uenishi | .............. | H04N 5/23212 348/349 |
| 2015/0138429 A1* | 5/2015 | Ogura | ................ | H04N 5/23212 348/349 |
| 2015/0201182 A1* | 7/2015 | Chang | ................ | H04N 13/0271 348/47 |
| 2015/0213588 A1* | 7/2015 | Wang | ..................... | G06T 7/002 348/47 |
| 2015/0213589 A1* | 7/2015 | Chou | ................. | H04N 13/0239 348/47 |
| 2015/0229913 A1* | 8/2015 | Bei | ....................... | G06T 7/0075 348/46 |
| 2015/0249783 A1* | 9/2015 | Zheng | ............... | H04N 5/23212 348/349 |
| 2015/0350527 A1* | 12/2015 | Hamano | ............. | H04N 1/2112 348/231.99 |
| 2016/0006948 A1* | 1/2016 | Takao | ................. | H04N 5/2628 348/345 |
| 2016/0147040 A1* | 5/2016 | Watanabe | ............. | G03B 13/36 396/81 |

OTHER PUBLICATIONS

English translation of TIPO Office Action dated Dec. 25, 2015 in corresponding Taiwan application (No. 103134861).

* cited by examiner

VIDEO RECORDING DEVICE AND ASSOCIATED VIDEO RECORDING METHOD

This application claims the benefit of Taiwan application Serial No. 103134861, filed Oct. 7, 2014, the subject matter of which is incorporated herein by reference.

BACKGROUND OF THE INVENTION

1. Field of the Invention

The invention relates in general to a video recording device and a video recording method, and more particularly to a video recording device and a video recording method of automatically adjusting a focus parameter.

2. Description of the Related Art

More and more electronic devices (hereinafter referred to as video recording devices), such as digital cameras or mobile phones, provide recording functions. When the user continuously uses the recording function, a relative distance between the to-be-captured target and the video recording device may change during recording.

Figure 1:
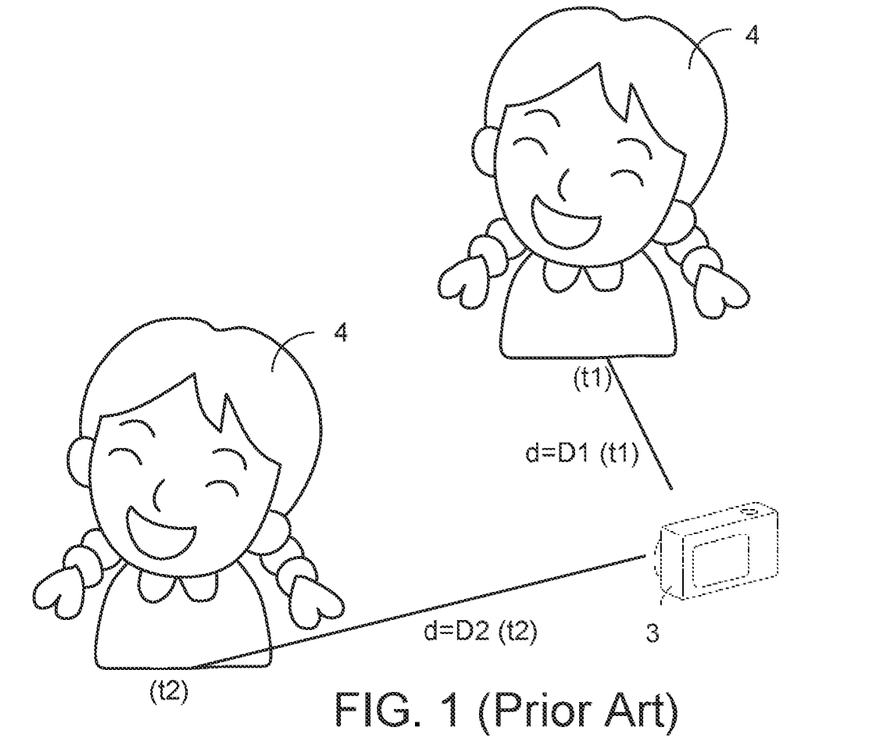
FIG. 1 (prior art) is a schematic view showing a relative distance change between a to-be-captured target and a video recording device.

FIG. 1 is a schematic view showing a relative distance change between a to-be-captured target and a video recording device. Referring to FIG. 1, assuming a position of a to-be-captured target 4 is on the top of FIG. 1 at a first time point t1, and then the to-be-captured target 4 moves to the left side of FIG. 1 at a second time point t2. The relative distance (d) between the to-be-captured target 4 and the video recording device 3 is also correspondingly changed from a first distance D1 to a second distance D2. With the change of the relative distance (d), the zoom lens inside the video recording device 3 also needs to adjust its focus parameter so as to record the clear capturing picture.

In addition to the condition of FIG. 1, the zoom lens may also be affected by position of the user, who holds the video recording device and moves to another position, and cannot record the clear capturing picture because the relative distance between the to-be-captured target 4 and the video recording device 3 is changed. Alternatively, when the user changes the to-be-captured target (e.g., from the first to-be-captured target to the second to-be-captured target) upon recording, the zoom lens also needs to perform the corresponding adjustment because the relative distance between the video recording device and the first to-be-captured target is different from the relative distance between the video recording device and the second to-be-captured target.

In order to make the recording effect become clearer, many video recording devices provide the continue autofocus (hereinafter referred to as CAF) functions. In short, in the video recording device with the continue autofocus function, the position of the zoom lens is continuously adjusted with the movement of the to-be-captured target 4. Incidentally, the focal length of the zoom lens will be adjusted to the settings such that the to-be-captured target is clearly displayed.

During recording, the video recording device with the continue autofocus function needs to dynamically adjust the position of the zoom lens in correspondence with the movement of the to-be-captured target, and thus to find the suitable focal length. The process of dynamically adjusting the zoom lens needs to continuously change the position of the zoom lens. When the position of the zoom lens is adjusted, the video recording device 3 still needs to perform the recording through the zoom lens. Consequently, in the process of continuously recording, the method of dynamically adjusting the position of the zoom lens will cause the jitter phenomenon in the recording content.

SUMMARY OF THE INVENTION

According to a first aspect of the present invention, a video recording device is provided. The video recording device includes a main capturing module, a supplementary capturing module and a controller. The main capturing module records a to-be-captured target according to a main focus parameter. The supplementary capturing module captures the to-be-captured target and generates a plurality of supplementary capturing pictures. The controller is electrically connected to the main capturing module and the supplementary capturing module. The controller selectively updates the main focus parameter according to a supplementary focus parameter, wherein the supplementary focus parameter is obtained according to the supplementary capturing pictures.

According to a second aspect of the present invention, a video recording method is provided. The video recording method is applied to a video recording device has a main capturing module and a supplementary capturing module. The video recording method includes following steps. Firstly, a to-be-captured target is recorded according to a main focus parameter. Secondly, the to-be-captured target is captured upon recording and generating a plurality of supplementary capturing pictures, wherein the supplementary focus parameter is obtained according to the supplementary capturing pictures. Then; the main focus parameter is selectively updated according to a supplementary focus parameter.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides a video recording device using two capturing modules. In the video recording device, one capturing module functions as a main camera and is referred to as a main capturing module, and the other capturing module functions as a sub camera and is referred to bas a supplementary capturing module. The main capturing module records a to-be-captured target, while the supplementary capturing module assists the main capturing module in setting a main focus parameter. That is, in the overall recording process, the main focus parameter corresponding to the main capturing module is generated from main capturing pictures captured by the main capturing module or supplementary capturing pictures captured by the supplementary capturing module according to different conditions.

Figure 2:
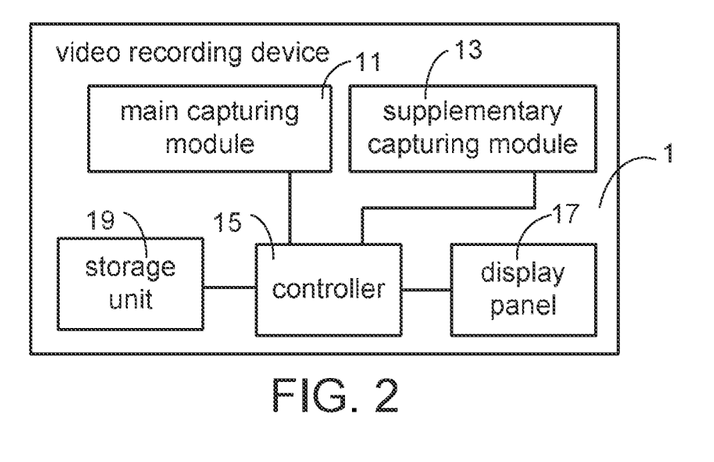
FIG. 2 is a block diagram showing a video recording device according to an embodiment of the invention.

FIG. 2 is a block diagram showing a video recording device 1 according to an embodiment of the invention. Referring to FIG. 2, the video recording device 1 of the invention includes a main capturing module 11, a supplementary capturing module 13, a controller 15 and a display panel 17. The controller 15 is electrically connected to the main capturing module 11, the supplementary capturing module 13 and the display panel 17. In addition, the video recording device 1 may further include a storage unit 19 electrically connected to the controller 15.

The main capturing module 11 and the supplementary capturing module 13 have substantially similar internal structures. The main focus parameter is equivalent to a focal length of the zoom lens in the main capturing module 11. Thus, setting the main focus parameter is equivalent to changing the position of the zoom lens in the main capturing module 11. Similarly, the supplementary focus parameter is equivalent to the focal length of the zoom lens in the supplementary capturing module 13. Thus, setting the supplementary focus parameter is equivalent to changing the position of the zoom lens in the supplementary capturing module 13.

The main capturing module 11 and the supplementary capturing module 13 are disposed on the same side of the video recording device 1, and most of the viewing angle of the main capturing module 11 overlaps with the viewing angle of the supplementary capturing module 13. The main capturing module 11 captures the main capturing pictures, and the supplementary capturing module 13 captures the supplementary capturing pictures. Generally speaking, the resolution of the main capturing module 11 is higher than the resolution of the supplementary capturing module 13. Thus, the display panel 17 displays the main capturing pictures captured by the main capturing module 11, and the user can watch the main capturing pictures on the display panel 17. On the other hand, the supplementary capturing pictures are only for the estimation of whether the supplementary capturing module 13 correctly focuses, and the display panel 17 does not display the supplementary capturing pictures.

When the recording just starts, the video recording device 1 determines the main focus parameter according to the main capturing pictures, captured by the main capturing module 11, and the automatic focus algorithm. At this time, when the recording just starts or before the record starts, the value of the main focus parameter obtained according to the multiple main capturing pictures and the automatic focus algorithm is defined as the first main recording focal length.

On the other hand, the video recording device 1 also determines the supplementary focus parameter when the recording just starts according to multiple supplementary capturing pictures, captured by the supplementary capturing module 13, and the automatic focus algorithm. During recording, the video recording device 1 continuously captures the supplementary capturing pictures, and calculates how to adjust the supplementary focus parameter according to the captured supplementary capturing pictures and the automatic focus algorithm. The supplementary focus parameter, obtained by way of adjustment, represents the supplementary focal length setting, which should be adopted by the supplementary capturing module 13 in correspondence with the actual relative distance between the to-be-captured target and the video recording device 1 when the relative distance changes as the to-be-captured target moves or changes.

The video recording device 1 of the invention can use the controller or the main/supplementary capturing module to execute the automatic focus algorithm. Here, the type of the correspondingly used automatic focus algorithm needs not to be restricted. For example, it is possible to adopt the continue auto focus algorithm, the hill climbing algorithm, the exhaustive search algorithm, the slope predict algorithm or the like.

Thereafter, when the to-be-captured target moves or changes to cause the video recording device 1 need to refocus to perform the clear recording, the video recording device 1 only uses the main capturing module 11 to capture the main capturing picture, but does not generate the new main focus parameter according to the main capturing pictures. The invention continuously detects and updates the supplementary focus parameter according to the supplementary capturing pictures, captured by the supplementary capturing module 13, in conjunction with the execution of the automatic focus algorithm. After the updated supplementary focus parameter is obtained, the controller 15 judges whether to update the main focus parameter or not according to the updated supplementary focus parameter.

As mentioned hereinabove, when the supplementary capturing module 13 is utilized to capture the supplementary capturing pictures and the supplementary focus parameter is obtained according to the supplementary capturing pictures in conjunction with the automatic focus algorithm, the main capturing module 11 still keeps recording using the predefined value of the main focus parameter (hereinafter referred to as the first main recording focal length). In other words, the main capturing pictures, obtained by the main capturing module 11 upon recording, are not used for generating the main focus parameter.

Thereafter, the controller 15 generates a new predefined value of the main focus parameter (hereinafter referred to as the second main recording focal length) according to the updated supplementary focus parameter through a conversion formula or a look-up table. When this method is adopted, the main capturing module 11 can rapidly switch to the suitable main focal length setting. Thus, the main capturing module 11 can shorten the time of repeatedly adjusting the main focus parameter. According to the idea of the invention, the main focus parameter can be adjusted in the shortest period of time, so that the condition of the video jitter, generated upon the position adjustment of the main zoom lens when the main capturing module 11 adjusts the main focus parameter, can be improved.

It is to be noted that because the relative distance between the to-be-captured target and the video recording device may fluctuate many times upon recording, and/or the to-be-captured target may change, it represents that the main focus parameter used by the main capturing module 11 needs to be adjusted many times during recording. Similarly, the processes of repeatedly adjusting the main focus parameter can follow the idea of the invention. The main capturing module 11 performs recording according to the main focus parameter (first main recording focal length) updated in each time, and then updates the main focus parameter (second main recording focal length) in the next time. The updated main focus parameter is generated by the adjustment of the supplementary focus parameter.

The main focus parameter of the main capturing module 11 may be selected from one of various main focal length settings, and the supplementary focus parameter of the supplementary capturing module 13 can be selected from one of various supplementary focal length settings. These main focal length settings and these supplementary focal length settings correspond to different capturing distances. These capturing distances are equivalent to the relative distances between the to-be-captured target and the video recording device when the to-be-captured target is actually captured. In addition, the relative position between the main capturing module 11 and the supplementary capturing module 13 on the video recording device 1 is known. Thus, corresponding relationships are present between the capturing distance, the main focal length setting and the supplementary focal length setting.

Corresponding to the relative distance between the to-be-captured target and the video recording device 1, the suitable supplementary focal length setting is determined by the supplementary capturing pictures, captured by the supplementary capturing module 13, in conjunction with the execution of the automatic focus algorithm. When the suitable supplementary focal length setting is chosen as the supplementary focus parameter, the main focal length setting, used as the main focus parameter, is obtained through the corresponding relationships. Herein, the setting of the correspondingly obtained main focus parameter is defined as the second main recording focal length.

After the second main recording focal length is obtained, the video recording device 1 can directly update the main focus parameter according to the second main recording focal length. Alternatively, in order to prevent the main focus parameter from being too frequently adjusted, the update condition can be additionally set. In addition, only when the update condition is satisfied, the main focus parameter is definitely updated from the first main recording focal length to the second main recording focal length. On the contrary, if the update condition is not satisfied, then the first main recording focal length is still used as the main focus parameter.

Based on the corresponding relationships, the controller 15 can obtain the second main recording focal length by way of the parameter conversion or look-up-table. According to the idea of the invention, the controller 15 can perform the parameter conversion on the supplementary focus parameter of the supplementary capturing module 13 according to a pre-stored conversion formula, and accordingly obtain the second main recording focal length. For example, it may be assumed that the main focus parameter is equivalent to the corresponding supplementary focus parameter plus a deviation.

Alternatively, the invention can utilize the storage unit 19 to store the look-up table of the main focus parameter versus the supplementary focus parameter. According to the look-up table, the controller 15 can identify which predefined value of the main focus parameter in the look-up table corresponds to the adjusted supplementary focus parameter. Then, the predefined value of the main focus parameter corresponding to the adjusted supplementary focus parameter is further used as the second main recording focal length.

In the following example, a look-up table will be described. The fields from left to right sequentially represent the capturing distance, the main focus parameter and the supplementary focus parameter. Herein, the capturing range is classified into several class intervals. The number of class intervals and capturing range corresponding to each class interval can be freely defined according to different video recording devices.

First, it is determined how the main focus parameter should be adjusted so that the main capturing module 11 can capture the clear main capturing picture when the capturing distance is infinity. In addition, the main focus parameter in this condition is defined as the first main focal length setting. Similarly, it is determined how to adjust the supplementary focus parameter so that the supplementary capturing module 13 can capture the clear supplementary capturing picture when the capturing distance is infinity. Next, the main focus parameter in this condition is defined as the first supplementary focal length setting. Thus, the second row in the following table can be obtained.

Similarly, the other corresponding relationships between the ranges of the capturing distances, the main focal length settings and the supplementary focal length settings may also be obtained. This look-up table can be established and stored in the storage unit 19 before the shipment of the video recording device. Alternatively, the video recording device 1 can provide the setting function for the user to define and store the settings in the storage unit 19.

| Capturing distance | Main focus parameter | Supplementary focus parameter |
|---|---|---|
| First class interval (50M to infinity) | First main focal length setting | First supplementary focal length setting |
| Second class interval (10M to 50M) | Second main focal length setting | Second supplementary focal length setting |
| Third class interval | Third main focal length setting | Third supplementary focal length setting |
| ... | ... | ... |
| (N − 2)-th class interval (50 cm to 150 cm) | (N − 2)-th main focal length setting | (N − 2)-th supplementary focal length setting |
| (N − 1)-th class interval (10 cm to 50 cm) | (N − 1)-th main focal length setting | (N − 1)-th supplementary focal length setting |
| N-th class interval (shorter than 10 cm) | N-th main focal length setting | N-th supplementary focal length setting |

It is to be noted that the look-up table is only used for the descriptions of the corresponding relationships between the capturing distance, the main focus parameter and the supplementary focus parameter. In the practical application, the representations of the capturing distance, the main focus parameter and the supplementary focus parameter need not to be particularly restricted. For example, the main focus parameter and the supplementary focus parameter may also be represented by the actual focal length of the zoom lens, and may also be represented by the step of adjusting the zoom lens.

Incidentally, the main capturing module 11 and the supplementary capturing module 13 may have the active focus or passive focus functions. Furthermore, the automatic focus algorithm of the invention needs not to be particularly restricted.

Figure 3A:
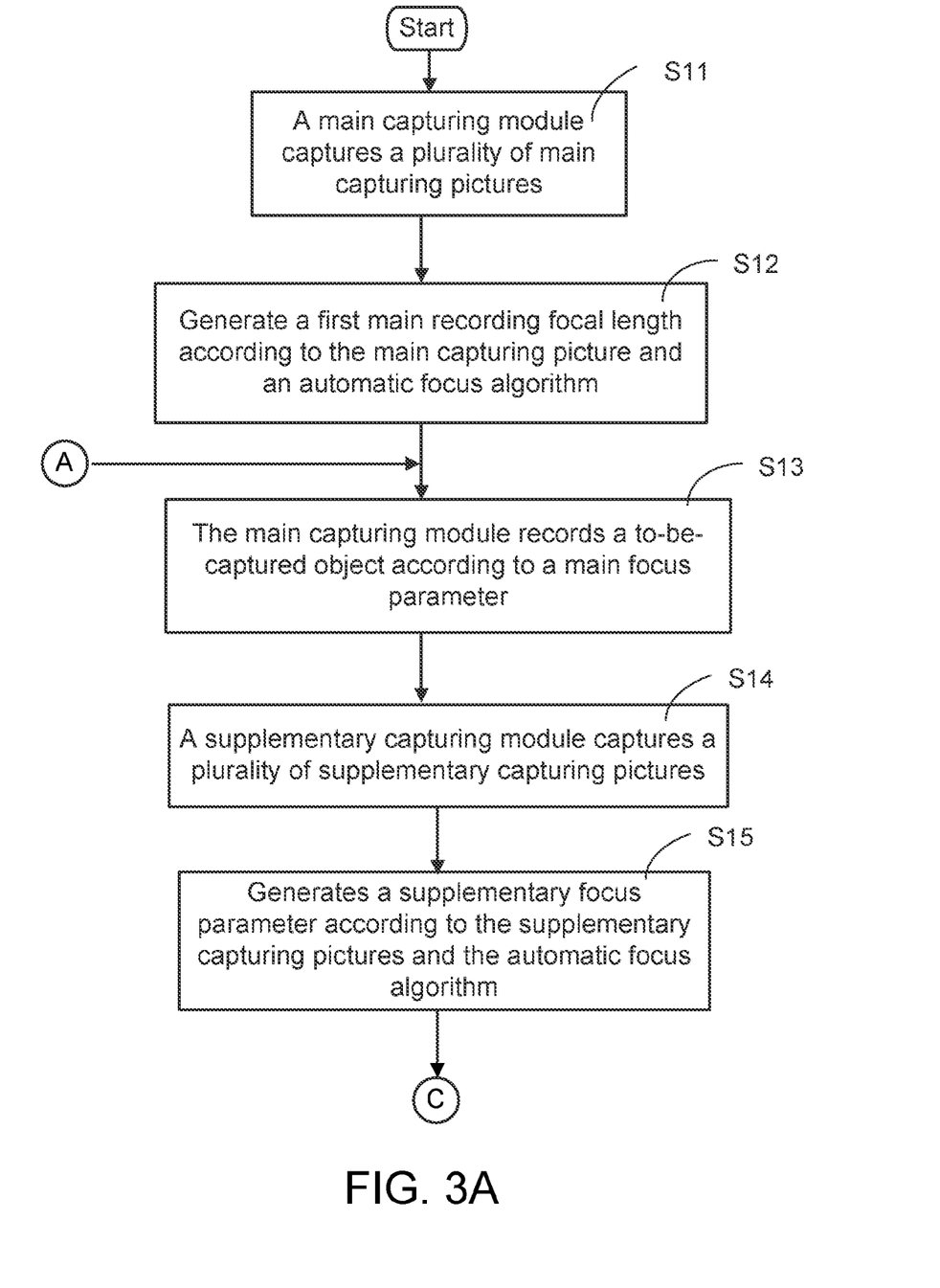
FIGS. 3A and 3B are flow charts showing a capturing method of the invention.
Figure 3B:
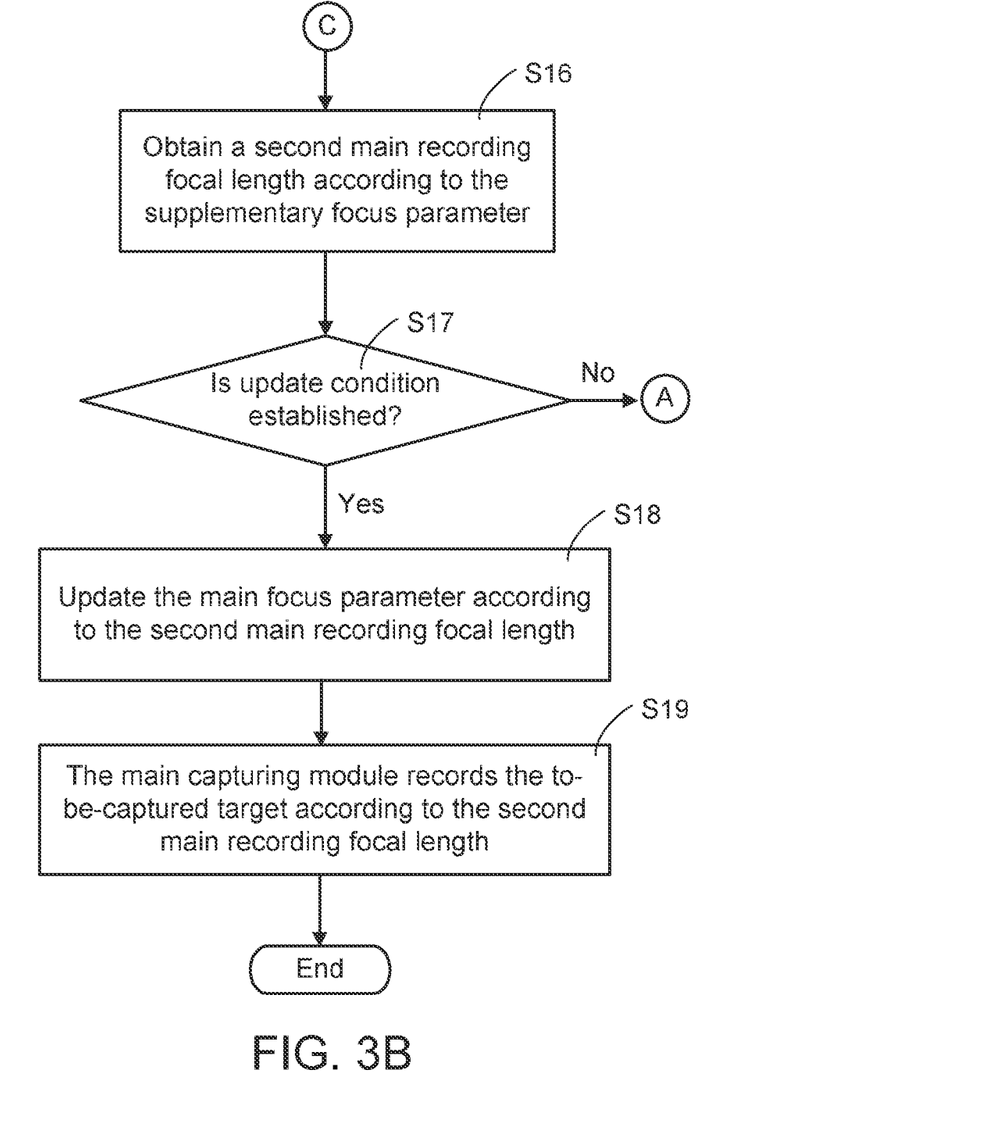

FIGS. 3A and 3B are flow charts showing a capturing method of the invention. Referring to FIG. 3A, the main capturing module 11 firstly captures a plurality of main capturing pictures (step S11); and then the first main recording focal length is generated according to the plurality of main capturing pictures and the automatic focus algorithm (step S12). The first main recording focal length is a predefined value selected from the first main focal length setting to the N-th main focal length setting. According to different applications, the video recording device 1 can generate the first main recording focal length by the controller 15 according to main capturing pictures after the automatic focus algorithm is executed. Alternatively, the video recording device 1 may also generate the first main recording focal length by the main capturing module 11 according to the main capturing pictures after the automatic focus algorithm is executed.

After the first recording focal length is generated, the main capturing module 11 uses the first main recording focal length as the main focus parameter, and the main capturing module 11 starts to record and capture the to-be-captured object according to the main focus parameter (step S13). During the recording period in which the main capturing module 11 performs the recording, the supplementary capturing module 13 captures a plurality of supplementary capturing pictures (step S14). The supplementary focus parameter can be correspondingly generated after the supplementary capturing module 13 captures the plurality of supplementary capturing pictures in conjunction with the execution of the automatic focus algorithm (step S15). The supplementary focus parameter corresponds to a predefined value selected from the first supplementary focal length setting to the N-th supplementary focal length setting. The supplementary capturing module 13 may have a built-in chip for executing the automatic focus algorithm. Alternatively, the controller 15 executes the automatic focus algorithm. Thereafter, the controller 15 can obtain the second main recording focal length corresponding to the main capturing module 11 according to the supplementary focus parameter by way of formula conversion or look-up-table (step S16). Then, the controller 15 determines whether the update condition is satisfied according to the first main recording focal length and the second main recording focal length (step S17).

The update condition may be defined as follows. When the difference between the second main recording focal length and the first main recording focal length is greater than a predetermined threshold, the update condition is deemed as being satisfied. On the contrary, the update condition is deemed as not being satisfied. The difference between the second main recording focal length and the first main recording focal length represents the absolute value of the second main recording focal length minus the first main recording focal length.

The actual situations corresponding to the satisfaction of the update condition can include the following situations. In the first situation, the to-be-captured object moves and the relative distance between the to-be-captured object and the video recording device 1 dramatically changes. In the second situation, the user holding the video recording device 1 moves to cause the too great relative distance change between the to-be-captured object and the video recording device. In the third situation, the user changes the to-be-captured target. For example, the first to-be-captured target serves as the main recording body at the beginning of recording, but the main recording body is switched to the second to-be-captured target in the recording period.

If the update condition is determined as not being satisfied, it represents that the first main recording focal length adopted by the main capturing module 11 still makes the to-be-captured target being clearly recorded. At this time, the main focus parameter is not adjusted.

Incidentally, the main focus parameter represents the relative distance between the main zoom lens and the main sensor in the main capturing module 11. The relative position between the main zoom lens and the main sensor is determined according to the relative distance between the to-be-captured target and the video recording device 1. However, the corresponding relationships between the focus position of the main zoom lens and the relative distance between the to-be-captured target and the video recording device 1 need not to be proportional. Thus, the controller 15 may also classify the relative distance into multiple class intervals. Furthermore, the controller 15 may also use different values of predetermined thresholds to determine the update condition according to different class intervals of relative distances. For example, when the relative distance is further, the larger predetermined threshold is used. The selection and/or setting of the predetermined threshold can be defined by the manufacturer of the video recording device 1 or the user.

As mentioned hereinabove, if the difference between the second main recording focal length and the first main recording focal length is determined as being greater than the predetermined threshold, it represents that the position change of the to-be-captured target is greater. Incidentally, if the first main recording focal length is still used to perform the capturing, the clearness of the recording effect will be poor. At this time, the controller 15 will use the second main recording focal length to update the main focus parameter (step S18). Thereafter, the main capturing module 11 records the to-be-captured target according to the second main recording focal length (step S19).

Figure 4:
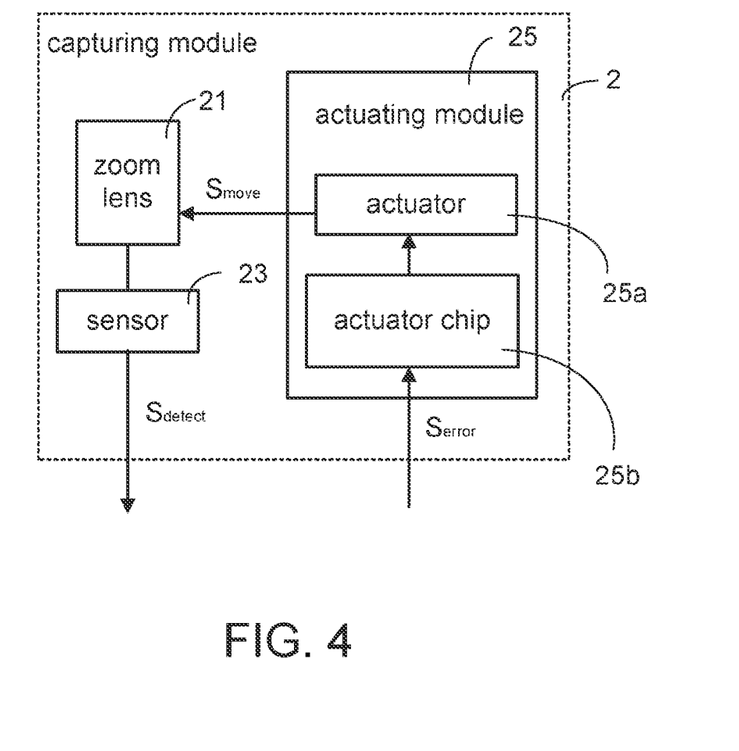
FIG. 4 is an internal block diagram showing a capturing module.

FIG. 4 is an internal block diagram showing a capturing module. Both the internal structures of the main capturing module 11 and the supplementary capturing module 13 are similar to the one shown in FIG. 4. Each capturing module 2 includes a zoom lens 21, a sensor 23 and an actuating module 25. The actuating module 25 and the sensor 23 are electrically connected to the controller of the video recording device. The actuating module 25 further includes an actuator 25a and an actuator chip 25b.

For the sake of illustration, the elements inside the main capturing module 11 may be defined a main zoom lens, a main sensor and a main actuating module (including a main actuator and a main actuator chip), and the elements inside the supplementary capturing module 13 may be defined as a supplementary zoom lens, a supplementary sensor and a supplementary main actuating module (including a supplementary actuator and a supplementary actuator chip).

The main/supplementary capturing module of the invention generates the focus parameter according to the passive focus method. First, the main/supplementary capturing module captures the plural main/supplementary capturing pictures. Next, the plural main/supplementary capturing pictures are used in conjunction with the automatic focus algorithm to determine whether the main/supplementary capturing module correctly focuses. As mentioned hereinabove, the automatic focus algorithm can be executed by the controller or the main/supplementary capturing module.

According to the above-mentioned description, it is obtained that the video recording device of the invention needs not to actually control the main capturing module 11 to perform the focusing process in the recording period. Instead, the idle (not actually used for recording) supplementary capturing module 13 is used to perform the focusing process. The supplementary capturing module 13 or the controller 15 generates the adjusted supplementary focus parameter corresponding to the relative position of the to-be-captured target after the to-be-captured target moves or changes. Thereafter, the main controller obtains the second main recording focal length for updating the main focus parameter according to the adjusted supplementary focus parameter.

After the second main recording focal length is obtained, the main focus parameter can be rapidly updated from the first main recording focal length to the second main recording focal length. The second main recording focal length corresponds to the to-be-captured target after the to-be-captured target moves or changes. Thus, when the main capturing module 11 swiftly adopts the second main recording focal length, the main capturing module 11 can clearly capture the to-be-captured target after the to-be-captured target moves or changes.

Because the clear focus can be obtained without repeatedly testing the suitable main focus parameter, the invention can decrease the number of times of repeatedly adjusting the position of the main zoom lens, which affect the recording quality of the main capturing module 11. Therefore, the video recording device and the video recording method of the invention can improve the drawback of generating the jitter of the recording picture due to the movement or change of the to-be-captured target in the recording period.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video recording device, comprising:
   a main capturing module, for capturing an imaged target according to a main focus parameter, wherein the main capturing module adopts a first main recording focal length as the main focus parameter;
   a supplementary capturing module, for capturing the imaged target and generating a plurality of supplementary capturing pictures; and
   a controller, electrically connected to the main capturing module and the supplementary capturing module, for selectively updating the main focus parameter according to a supplementary focus parameter, wherein the supplementary focus parameter is obtained according to the plurality of supplementary capturing pictures, and the controller obtains a second main recording focal length according to the supplementary focus parameter and selectively updates the main focus parameter according to the second main recording focal length;
   wherein the main capturing module captures a plurality of main capturing pictures before recording, and records the imaged target according to the main focus parameter obtained from the plurality of main capturing pictures;
   wherein when an update condition is satisfied, the controller selects the second main recording focal length as the main focus parameter; and
   when the update condition is not satisfied, the controller keeps the first main recording focal length as the main focus parameter,
   wherein the update condition represents that a difference between the second main recording focal length and the first main recording focal length is greater than a predetermined threshold.

2. The video recording device according to claim 1, wherein the supplementary focus parameter is obtained by the controller according to an automatic focus algorithm and the plurality of supplementary capturing pictures, and the main focus parameter is obtained by the controller according to the automatic focus algorithm and the plurality of main capturing pictures.

3. The video recording device according to claim 1, wherein the supplementary focus parameter is obtained by the supplementary capturing module according to an automatic focus algorithm and the plurality of supplementary capturing pictures, and the main focus parameter is obtained by the main capturing module according to the automatic focus algorithm and the plurality of main capturing pictures.

4. The video recording device according to claim 1, wherein the controller performs parameter conversion on an adjusted supplementary focus parameter to obtain the second main recording focal length.

5. The video recording device according to claim 1, further comprising:
   a storage unit electrically connected to the controller, for storing a look-up table, wherein the controller accesses the look-up table and obtains the second main recording focal length according to the supplementary focus parameter.

6. The video recording device according to claim 5, wherein the look-up table comprises a plurality of main focal length settings corresponding to the main capturing module, and corresponding relationships between a plurality of supplementary focal length settings corresponding to the supplementary capturing module.

7. A video recording method applied to a video recording device having a main capturing module and a supplementary capturing module, the video recording method comprising the steps of:
   capturing a plurality of main capturing pictures before recording;
   obtaining a main focus parameter from the plurality of main capturing pictures;
   recording a imaged target according to the main focus parameter;
   capturing the imaged target upon recording and generating a plurality of supplementary capturing pictures; and
   selectively updating the main focus parameter according to a supplementary focus parameter, wherein the supplementary focus parameter is obtained according to the plurality of supplementary capturing pictures;
   wherein the step of selectively updating the main focus parameter according to the supplementary focus parameter comprises the steps of:
   adopting a first main recording focal length as the main focus parameter upon recording;
   obtaining a second main recording focal length according to the supplementary focus parameter; and
   selectively updating the main focus parameter according to the second main recording focal length;
   wherein the step of selectively updating the main focus parameter according to the second main recording focal length comprises the steps of:
   selecting the second main recording focal length as the main focus parameter when an update condition is satisfied; and
   keeping the first main recording focal length as the main focus parameter when the update condition is not satisfied,
   wherein the update condition represents that a difference between the second main recording focal length and the first main recording focal length is greater than a predetermined threshold.

8. The video recording method according to claim 7, wherein the step of obtaining the second main recording focal length according to the supplementary focus parameter represents:
   performing parameter conversion on an adjusted supplementary focus parameter to obtain the second main recording focal length.

9. The video recording method according to claim 7, wherein the step of obtaining the second main recording focal length according to the supplementary focus parameter represents:

storing a look-up table; and
accessing the look-up table according to the supplementary focus parameter, and thus obtaining the second main recording focal length, wherein the look-up table comprises corresponding relationships between a plurality of main focal length settings and a plurality of supplementary focal length settings.

\* \* \* \* \*